United States Patent [19]

Bohannan

[11] Patent Number: 5,307,889
[45] Date of Patent: May 3, 1994

[54] PORTABLE GOLF CART

[76] Inventor: William D. Bohannan, East 11122 Ferret, Spokane, Wash. 99206

[21] Appl. No.: 138

[22] Filed: Jan. 4, 1993

[51] Int. Cl.⁵ .................. B62D 61/06; B62D 51/04; B62K 15/00
[52] U.S. Cl. .................... 180/13; 180/19.2; 180/208; 180/214; 180/65.5; 280/DIG. 5
[58] Field of Search ............ 180/208, 213, 214, 19.2, 180/13, 65.1, 65.5; 280/DIG. 5

[56]  References Cited
U.S. PATENT DOCUMENTS

| | | | |
|---|---|---|---|
| 2,649,162 | 8/1953 | Wooldridge et al. | 180/213 X |
| 2,771,145 | 11/1956 | Peters | 180/213 |
| 2,919,758 | 1/1960 | Newton et al. | 180/208 |
| 3,087,562 | 4/1963 | Harks | 180/19.2 |
| 3,168,156 | 2/1965 | Ulinski | 180/19.2 |
| 3,281,186 | 10/1966 | Davis | 298/19.2 |
| 3,388,761 | 6/1968 | Arpin | 180/208 |
| 3,608,659 | 9/1971 | Gardner | 280/DIG. 5 X |
| 3,941,198 | 3/1976 | Kappas | 180/208 |
| 4,081,047 | 3/1978 | Lovell et al. | 280/DIG. 5 X |
| 4,750,578 | 6/1988 | Brandenfels | 180/13 |
| 4,757,868 | 7/1988 | Cresswell | 180/208 X |
| 4,848,504 | 7/1989 | Olson | 180/19.1 |
| 4,874,055 | 10/1989 | Beer | 180/19.2 |

FOREIGN PATENT DOCUMENTS

| | | | |
|---|---|---|---|
| 2037634 | 2/1972 | Fed. Rep. of Germany | 280/DIG. 5 |
| 2469339 | 5/1981 | France | 180/213 |
| 7436 | 5/1916 | United Kingdom | |
| 2127364 | 4/1984 | United Kingdom | 280/DIG. 5 |

Primary Examiner—Margaret A. Focarino
Assistant Examiner—Peter English
Attorney, Agent, or Firm—Wells, St. John, Roberts, Gregory & Matkin

[57]  ABSTRACT

A golf cart or other personal utility vehicle includes a wheeled platform, a wheeled gooseneck frame detachably secured at the rear of the platform, and a detachable steering handle for turning a powered wheel on the gooseneck frame for steering purposes. A detachable upright post provides support for a conventional golf bag and set of clubs. A forwardly facing occupant seat is detachably mounted to the gooseneck frame, thereby placing the weight of an occupant substantially upon the rear driving and steering wheel. The golf cart provides a mechanized vehicle capable of use on all types of terrain. It can be readily disassembled for storage and transport within the trunk or cargo area of a conventional passenger automobile.

11 Claims, 6 Drawing Sheets

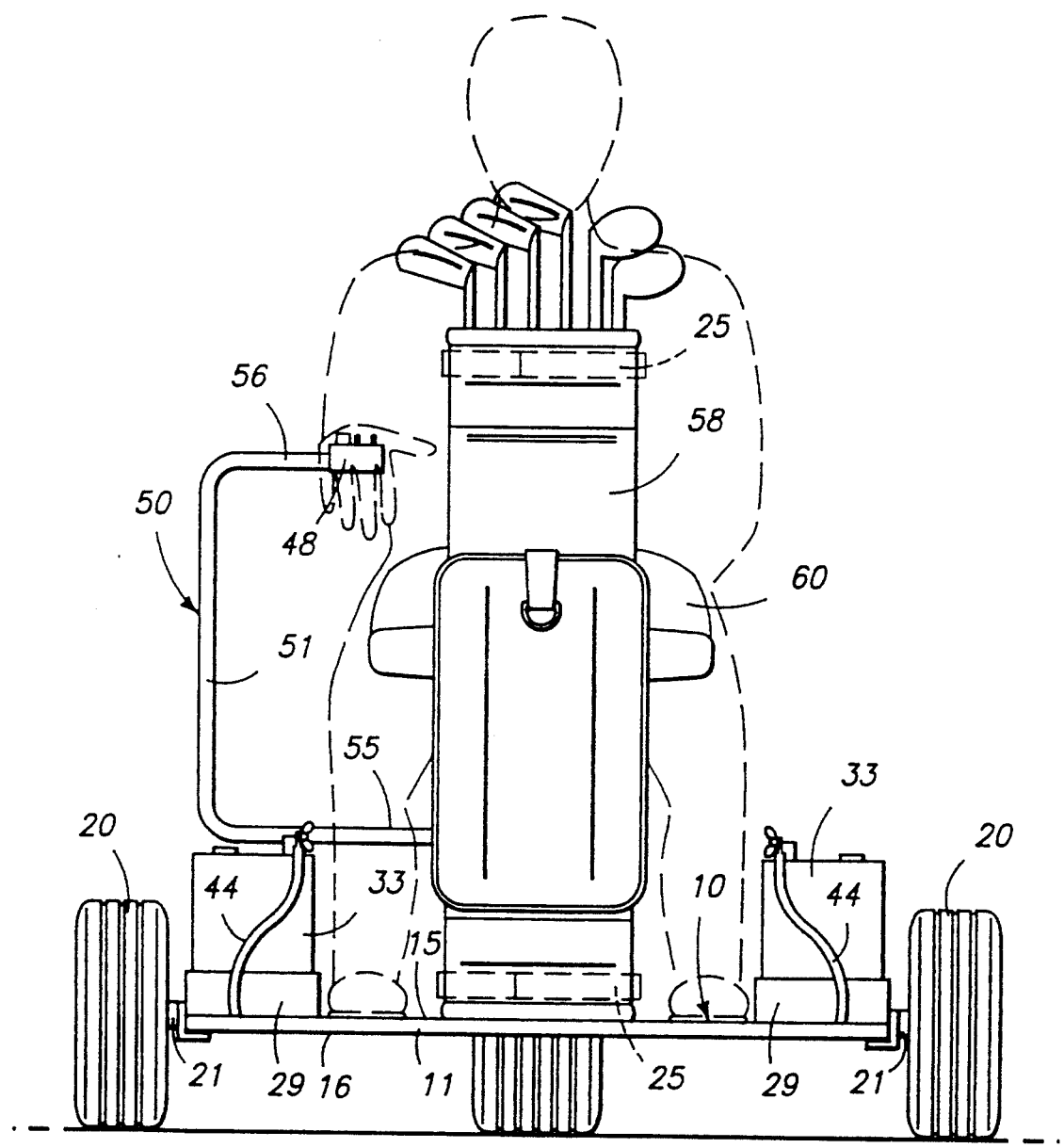

PORTABLE GOLF CART

TECHNICAL FIELD

This disclosure pertains to self-powered utility vehicles, and more specifically to portable golf carts. The described vehicle is a one-person golf cart that can be readily dismantled into separable components capable of being transported to and from a golf course within the trunk or other cargo compartment of a conventional passenger automobile.

BACKGROUND OF THE INVENTION

Self-powered golf carts are widely used during recreational use of golf courses. They also find usage as utility vehicles within warehouses, other large commercial buildings and various outdoor areas where personal transport is desired.

A typical golf cart is an electrically powered four-wheel vehicle designed to carry two people and their respective golf bags and clubs. Transporting such golf carts to and from a golf course or other facility normally requires either a trailer, truck or towing hitch. Many such golf carts are powered by gasoline engines, which limit their portability, since the drive train cannot be readily disassembled. Most electrically powered golf carts require heavy rechargeable batteries. They also are not designed for disassembly during normal usage.

The disclosed vehicle was developed to meet the needs of recreational golfers who desire the motorized advantages of a golf cart, but wish to facilitate its transport within a conventional automobile trunk or cargo area. In addition, many users of golf carts would prefer to store the vehicle within a minimum building area when it is not in use. To do this, the vehicle must be capable of being disassembled into relatively lightweight and compact components that can be readily reassembled. Both disassembly and reassembly must be relatively simple and quick to accomplish, without the need of specialized tools or training.

The present invention was designed to meet these needs and to serve as a personal self-powered vehicle, particularly for use on golf courses.

BRIEF DESCRIPTION OF THE DRAWINGS

Preferred embodiments of the invention are described below with reference to the accompanying drawings, which are briefly described below.

FIG. 6 is a front view illustrating the golf cart in use.

DETAILED DESCRIPTION OF THE PREFERRED EMBODIMENTS

Figure 1:
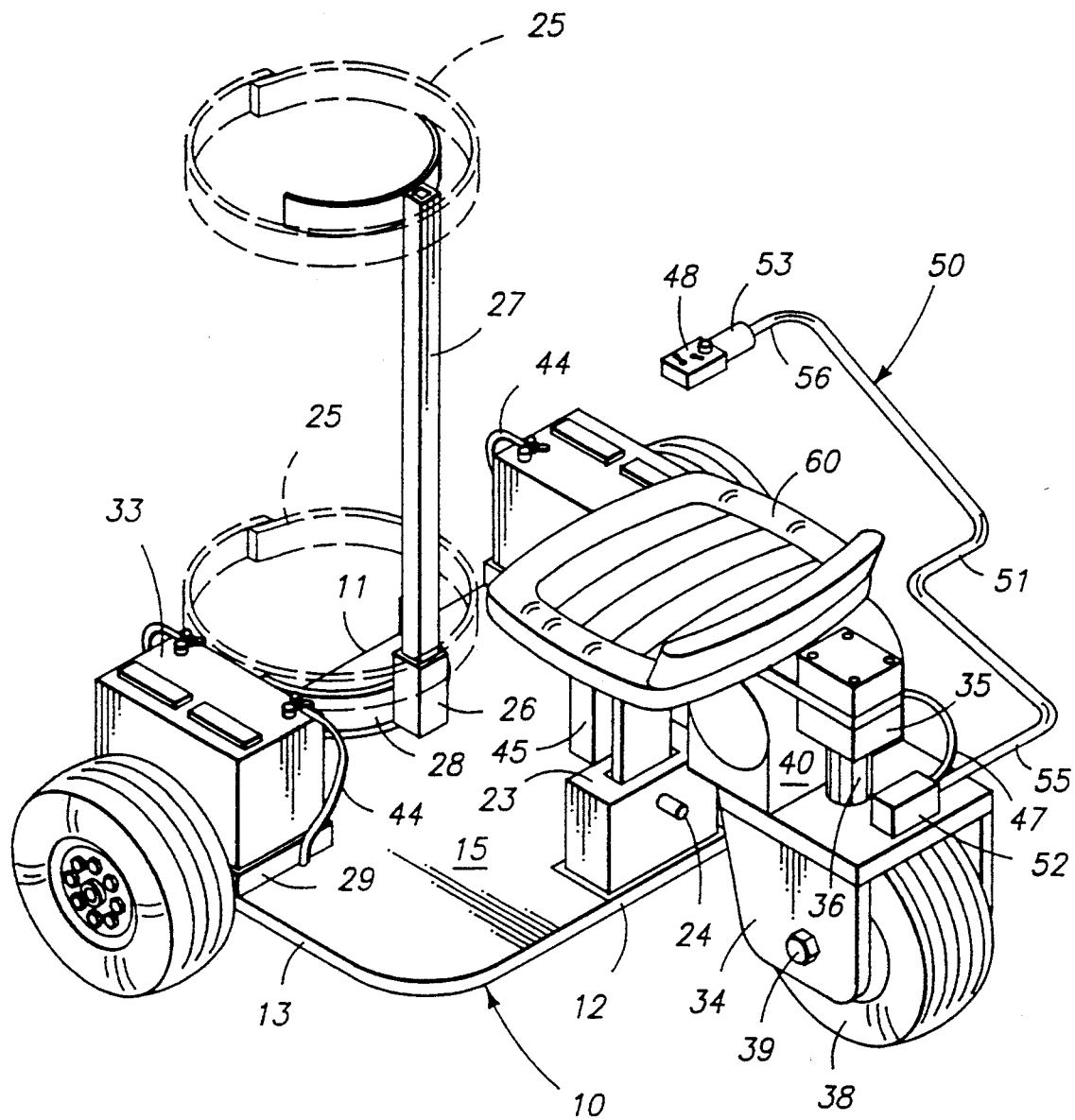
FIG. 1 is an assembled perspective view of the assembled golf cart.
Figure 2:
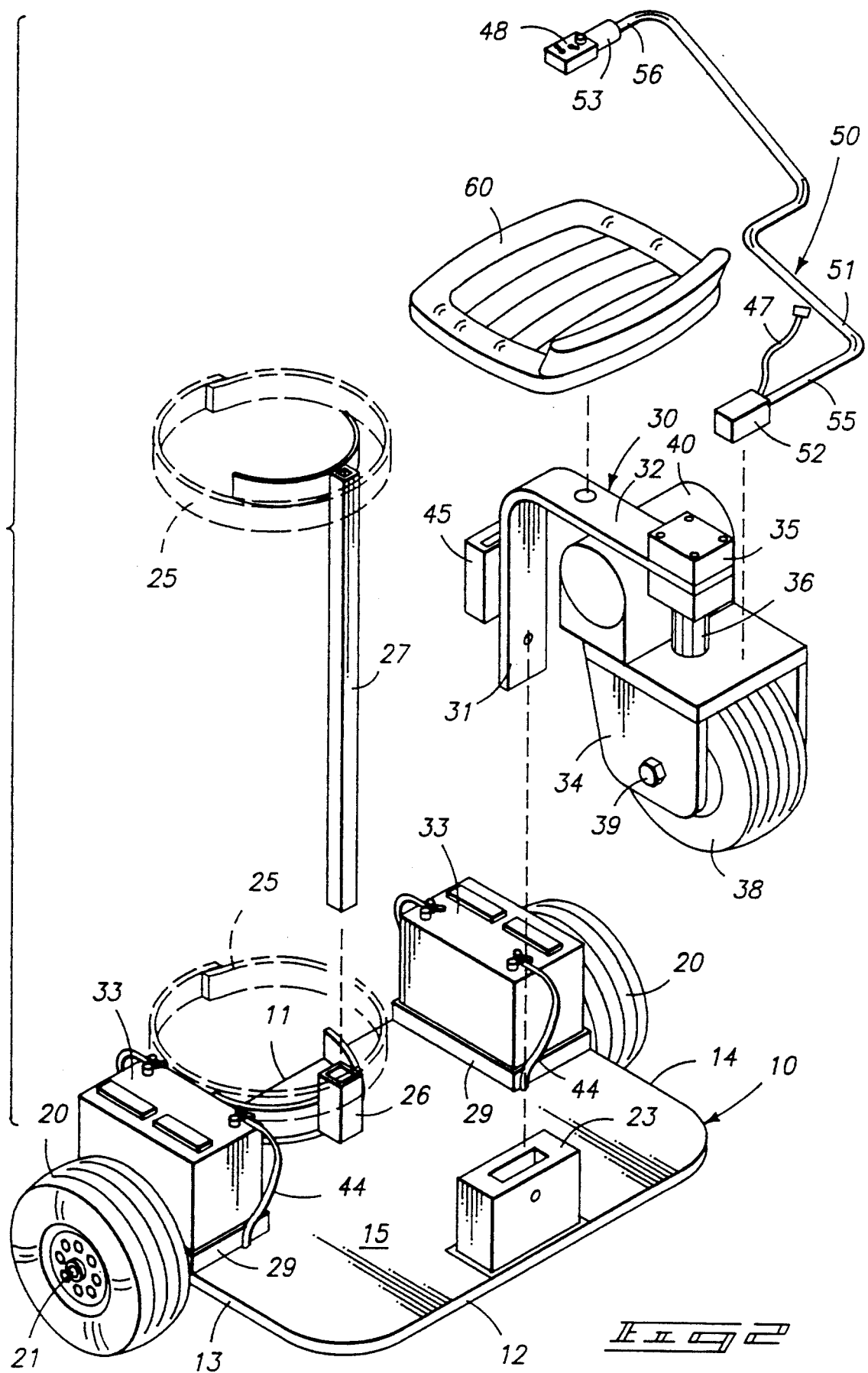
FIG. 2 is an exploded view of the disassembled golf cart components.
Figure 3:
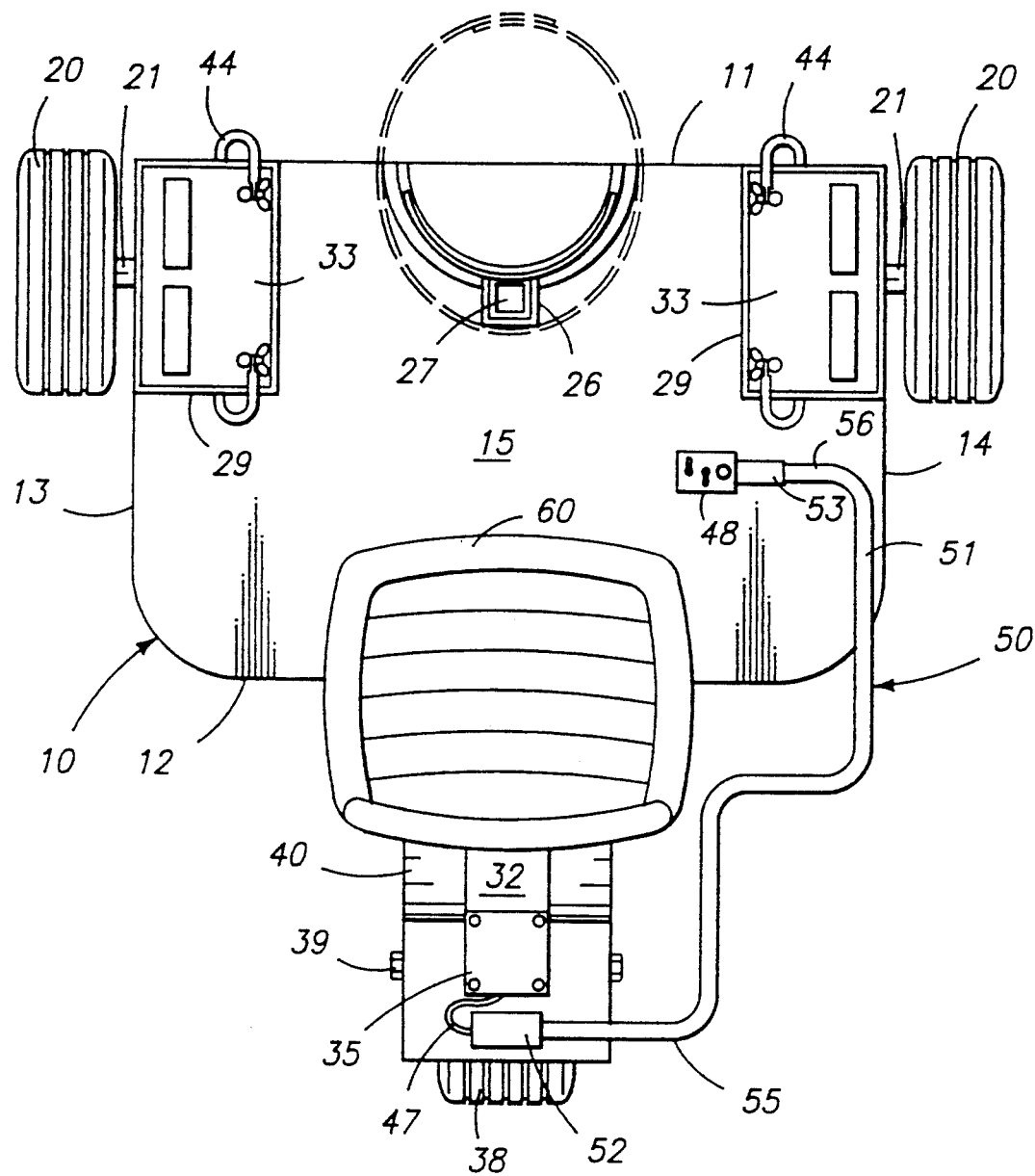
FIG. 3 is a top view of an assembled golf cart.

This disclosure of the invention is submitted in furtherance of the constitutional purposes of the U.S. Patent Laws "to promote the progress of science and useful arts" (Article 1, Section 8).

This description pertains generally to self-powered vehicles. The illustrated vehicle, designed specifically for use as a golf cart, has supporting ground-engaging wheels arranged symmetrically relative to a longitudinal center line of the vehicle. They are respectively positioned in the corners of a triangle.

In the description of the illustrated golf cart and its components, the terms "forward" and "rear" will be used in relation to the normal intended direction of operation of the vehicle. The base of the triangle faces in a forward direction relative to the intended direction of normal vehicle operation. The apex of the triangle formed by the wheels is located rearwardly.

While the illustrated vehicle is intended for use as an occupant-supporting golf cart, it is to be understood that the structure of the vehicle is capable of other uses for transport of an occupant and/or cargo other than the illustrated golf bag. As will be evident, the only portions of the vehicle designed specifically for the golf cart application are the golf bag receptacle and socket on the wheeled platform and the detachable post designed to support an upright conventional golf bag carried on the vehicle. The elimination of these elements would permit the vehicle to be readily modified as necessary for other portable applications.

The illustrated golf cart is designed as five readily detachable components capable of disassembly for storage and transport purposes and reassembly to ready the vehicle for use. They have been specifically designed to lie relatively flat adjacent to one another for storage within the trunk or cargo area of a typical passenger automobile.

The five components are: a wheeled platform 10; a goose-neck frame 30 carrying a powered and steerable wheel assembly; a steering handle 51; a supportive post 27 for a golf bag; and an occupant seat 60. These components are releasably secured to one another for quick assembly and disassembly as needed.

Platform 10 can be fabricated from a planar plate having a flat upper surface 15 and a downwardly facing underside 16. The platform 10 has longitudinally spaced transverse front and rear ends 11, 12 extending between opposite sides 13, 14. Its shape is substantially rectangular, with the rear corners of the platform being rounded for appearance and safety reasons. The top surface 15 of platform 10 can be suitably coated or covered to provide a frictional grip to guard against the user slipping when stepping onto or from the cart.

Platform 10 is partially supported by a pair of freely rotatable wheels 20. The wheels 20 are located adjacent the respective sides 13, 14 of platform 10, and are positioned adjacent to its front end 11. Wheels 20 are rotatably carried on transverse axles 21 on platform 10. Axles 21 rotatably mount wheels 20 about a common axis extending transversely across platform 10.

An upright open socket 23 is located on the top surface 15 of platform 10 in a fixed center position adjacent to its rear end 12. A golf bag receptacle 28, including a second upright open socket 26, is provided in a fixed center position at the front end 11 of platform 10. Socket 26 releasably mounts a complementary upright post 27 having upper and lower straps 25. The straps 25 can be wrapped about a golf bag to secure it against the post 27 during use of the golf cart.

A pair of open battery receptacles 29 are also provided at the respective front corners of platform 10. Releasable clamps or straps engage the battery receptacles 29 to hold conventional storage batteries 33 in stationary positions resting on the top surface 15 of platform 10.

The rear end 12 of platform 10 is supported by a removable gooseneck frame 30. The gooseneck frame 30, which is narrow in width when compared to the width of platform 10, extends upwardly and rearwardly from the platform in a transversely centered position across its rear end 12.

The gooseneck frame 30 includes a lower end along a forward upright element 31 that is joined at an upper end to a rearwardly extending element 32. The two elements 31 and 32, which angularly intersect one another, can be formed integrally or can be separately formed and permanently connected to one another at their intersection.

The lower end of the upright element 31 in the gooseneck frame 30 fits snugly within the aperture of the socket 23 at the rear end 12 of platform 10. It is releasably secured by a conventional fastening pin 24 or other releasable fastening device.

A wheel support 34 is pivotally mounted to the elevated rear end of the gooseneck frame 30 about an upright axis spaced rearwardly from platform 10. While it is preferable that this axis be vertical (perpendicular to the horizontal platform 10), it might be slightly offset from the vertical in either the forward or rearward direction if a castoring effect is desired.

The wheel support 34 includes an upright post 36 rotatably carried within surrounding bearings 35 mounted to the rear end of the rearwardly extending element 32 of gooseneck frame 30. Wheel support 34 rotatably carries at least one powered rear wheel 38 for ground engagement in conjunction with the previously-described paired front wheels 20. The illustrated wheel 38 is rotatably mounted about an axle 39 on the wheel support 34.

Figure 4:
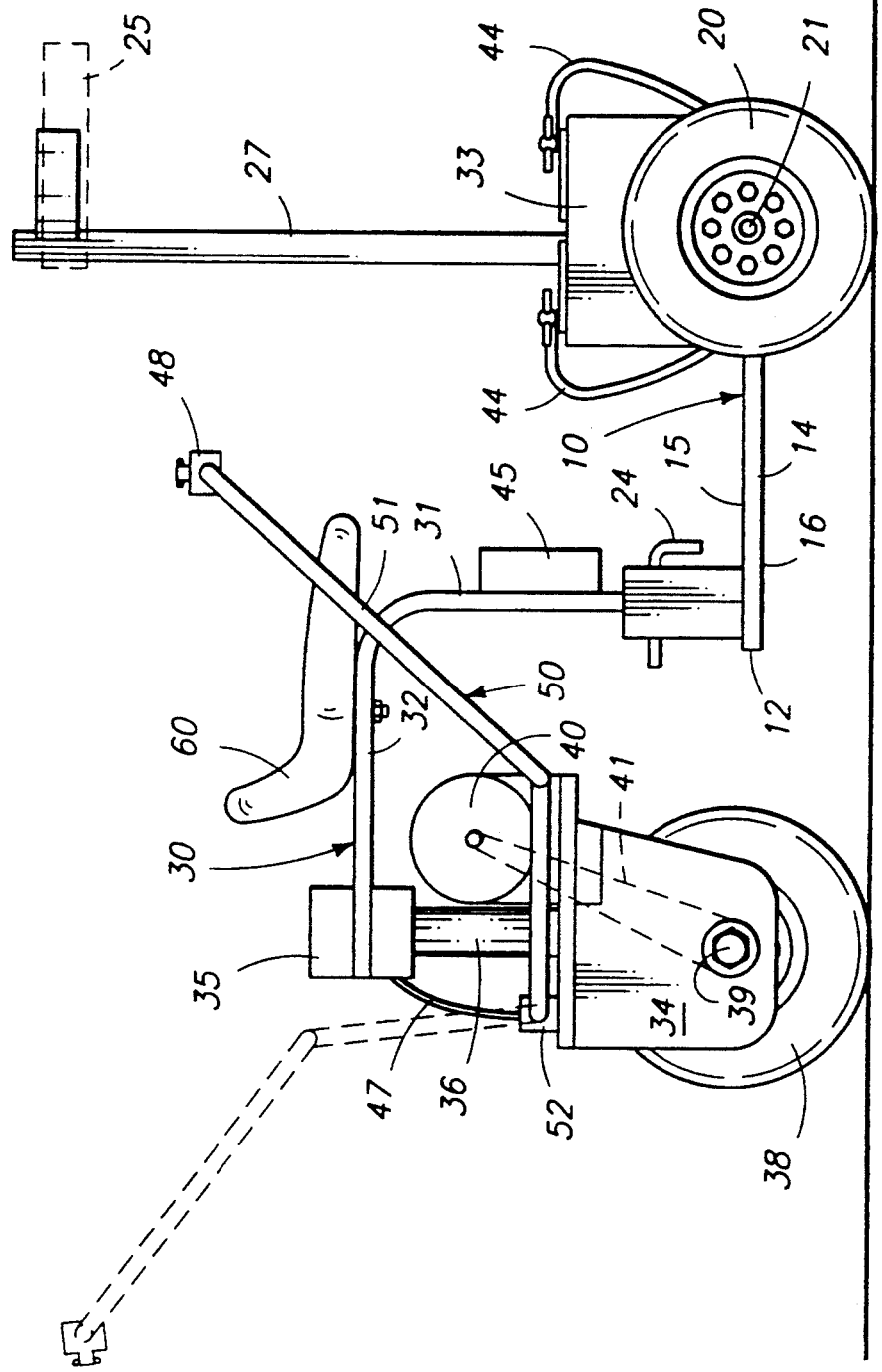
FIG. 4 is a side view, with the steering handle shown within dashed lines in an alternative position.
Figure 5:
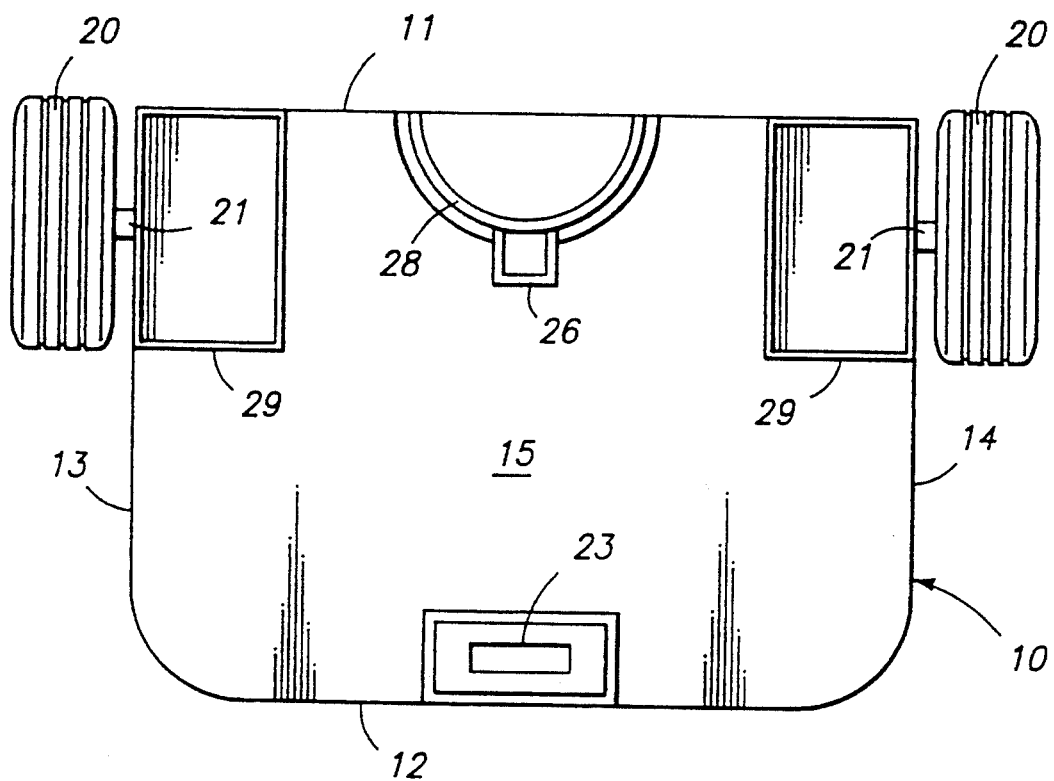
FIG. 5 is a top view of the platform.

Wheel support 34 also carries an electric motor 40. Motor 40 is drivingly connected to the powered wheel 38 through a reduction chain drive 41 (FIG. 4). A geared drive train, a variable transmission, pulleys and a connecting belt or other suitable alternative drive mechanisms can be utilized to transmit rotational forces between the motor 40 and the powered rear wheel 38 when desired.

A steering assembly 50 is operatively connected to the wheel support 34. Its purpose is to angularly position wheel support 34 and powered wheel 38 about the upright axis of post 36. Any desired mechanical or electrical steering arrangement can be utilized, but the preferred form is an elongated handle 51 having angularly offset inner and outer ends 55, 56.

The outer end 56 of handle 51 includes a frictional hand grip 53. Its inner end 55 is pivotally mounted to the wheel support 34 about a transverse axis. This is achieved by use of a releasably mounted hinged bracket 52. Hinged bracket 52 is detachable from the upper surface of wheel support 34 and can be readily assembled or disassembled by use of conventional releasable fasteners, including pins, bolts, etc. In the example shown, the pivotal axis of handle 51 on the wheel support 34 is spaced from and parallel to the rotational axis of the powered wheel 38.

Electric power is delivered from the batteries 33 by means of detachable battery power cables 44 leading from the batteries to the controller 45. A motor power cable connects motor 40 to the controller 45 on the gooseneck frame 30. Operation of powered wheel 38 is governed by a conventional electronic motor controller 45, which is shown mounted to the front surface of the upright element 31 of gooseneck frame 30.

The outer end 56 of handle 51 carries a manual switching device or devices 48 for controlling operation of motor 40. A control cable 47 leads from the switching device 48 to the controller 45. This arrangement provides manual motor control functions convenient to the user of the golf cart at the outer end 56 of handle 51. As one example, handle 51 might be provided with an on-off switch and a forward-reverse switch or with a three position switch ("forward," "reverse" and "on-off"). Variable motor speed can be provided by a knob-operated potentiometer that will control motor speed as a function of its angular position.

The motor controller 45 preferably facilitates recharging of batteries 33 when the golf cart is coasting downhill. This not only extends the life of a battery charge, but also provides dynamic braking to the golf cart as the motor 40 functions as an electrical generator.

The golf cart is completed by a forwardly-facing occupant seat 60. Seat 60 is releasably mounted to the gooseneck frame 30. As an example, its underside might be provided with one or more downwardly protruding posts receivable within complementary apertures in the rearwardly extending element 32. Such posts can be secured by pins or threaded fasteners as is necessary to hold the seat 60 in a stationary and forwardly-facing position.

FIG. 6 graphically illustrates the comfortable and safe support provided to an operator while using the golf cart in a riding position. The cart, shown carrying a golf bag 58 and set of golf clubs, positions the seated user at an elevation with his or her head at a comfortable height with visibility over the golf clubs. In addition, the weight of the seated occupant is directed substantially to the powered wheel 38, thereby improving both driving traction and steering response. The pivoted handle 51 can rest in its forward angular position. Its outer end 56 can be held by one hand of the user. The fingers of that hand can continuously operate the switching devices 48 that control operation of motor 40.

When desired, the elongated handle 51 can be pivoted rearwardly beyond the gooseneck frame 30, as shown in dashed lines in FIG. 4. This situates the steering handle and switching devices 48 to the back of the golf cart for one-handed operation by the operator while walking behind it. Such usage might be desired when slightly repositioning the golf cart or moving it over a minimal distance.

The golf cart provides substantial lateral stability because of its close juxtaposition to the ground and relatively wide forward wheelbase. The use of a narrow rear wheelbase, such as a single powered wheel 38, allows the vehicle to be turned in a very tight radius while maintaining lateral stability, even when inclined along a hillside. The golf cart design has been tested on golf courses with hilly terrain, and has been proven both practical and versatile in meeting the needs of one playing such a course.

Where some shelter from sun or rain is desired by the user of the golf cart, a conventional opened golf umbrella (not shown) can be extended upwardly from the supporting forward post 27 that is engaged by the golf bag.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A portable self-powered golf cart capable of being disassembled for storage and transport, comprising:

a planar platform having a flat upper surface and longitudinally spaced transverse front and rear ends that extend between a pair of opposite sides;

at least one upstanding golf bag support releasably secured within a socked fixed to the platform at said front end;

a pair of freely rotatable wheels each located adjacent a respective side of the platform adjacent to said front end, the wheels being rotatably mounted about a common axis extending transversely across the platform on axles mounted to the platform;

at least one storage battery support on the upper surface of the platform in transverse alignment with the pair of wheels;

at least one electrical storage battery releasably fixed within the battery support;

an upright open socket located in a fixed center position at the rear end of the platform;

a rigid gooseneck frame extending upwardly and rearwardly from the platform in a transversely centered position across said rear end, the gooseneck frame including a lower end releasably secured within the socket and an elevated rear end;

a wheel support pivotally mounted to the elevated rear end of the gooseneck frame about an upright axis spaced rearwardly from the platform;

at least one powered wheel rotatably carried on the wheel support;

an electrical motor mounted on the wheel support, the motor being drivingly connected to the powered wheel;

a motor control means operably connected between the storage battery and the motor;

a steering assembly operatively connected to the wheel support, the steering assembly including an elongated handle having an inner end and an outer end, the outer end of the handle having a grip with manually operable controls leading to the motor control means and the inner end of the handle being pivotally mounted about a transverse axis on the wheel support by a releasably mounted hinged bracket; and a forwardly-facing occupant seat releasably mounted to the gooseneck frame.

2. The golf cart of claim 1, wherein the transverse axis about which the handle is mounted is parallel to the rotational axis of the powered wheel.

3. A portable self-powered golf cart capable of being disassembled for storage and transport, comprising:

a horizontal platform having an upper surface and longitudinally spaced transverse front and rear ends that extend between a pair of opposite sides;

at least one golf bag support releasably mounted on the platform;

a pair of front wheels each located adjacent a respective side of the platform and adjacent to said front end, each front wheel being rotatably mounted to the platform on an axle for rotation about an axis extending transversely across the platform;

a gooseneck frame extending upwardly and rearwardly from the platform in a transversely centered position across said rear end, the gooseneck frame including a lower end and an elevated rear end;

a socket releasably joining the lower end of the gooseneck frame to the platform at a location adjacent the platform rear end;

a rear wheel support pivotally mounted to the elevated rear end of the gooseneck frame about an upright axis spaced rearwardly from the platform;

a rear wheel rotatably carried on the rear wheel support;

a motor mounted on the wheel support, the motor being drivingly connected to the rear wheel;

a steering assembly operatively connected to the rear wheel support, the steering assembly including an elongated handle having an inner end and an outer end;

a hinged bracket releasably mounting the inner end of the handle to the rear wheel support for pivotal movement thereon; and an occupant seat releasably mounted to the gooseneck frame.

4. A portable self-powered golf cart capable of being disassembled for storage and transport, as claimed by claim 3 wherein the outer end of the handle includes manually operable controls leading to the motor.

5. A portable self-powered golf cart capable of being disassembled for storage and transport, as claimed in claim 3, wherein the motor is an electric motor.

6. A portable self-powered golf cart capable of being disassembled for storage and transport, as claimed by claim 3, wherein the motor is an electric motor; and further comprising:

an electrical storage battery mounting support on the platform in substantial transverse alignment with the pair of front wheels.

7. A portable self-powered golf cart capable of being disassembled for storage and transport, as claimed by claim 3, wherein the platform is substantially planar and is supported by the wheels in an orientation parallel to a surface engaged by the wheels.

8. A portable self-powered golf cart capable of being disassembled for storage and transport, as claimed by claim 3, wherein the inner end of the handle is releasably mounted to the hinged bracket for pivotal movement about a transverse axis parallel to the rotational axis of the rear wheel.

9. A portable self-powered golf cart capable of being disassembled for storage and transport, as claimed by claim 3, wherein the wheels are symmetrically positioned with respect to a longitudinal centerline along the platform.

10. A portable self-powered golf cart capable of being disassembled for storage and transport, as claimed by claim 3, wherein the gooseneck frame includes a forward upright element joined at an upper end to a rearwardly extending element.

11. A portable self-powered golf cart capable of being disassembled for storage and transport, as claimed by claim 3, wherein the gooseneck frame includes a forward upright element joined at an upper end to a rearwardly extending element, the upright element further including a lower end that is releasably secured to the socket on the platform.

* * * * *